(12) United States Patent
Pang (10) Patent No.: US 7,400,051 B2
(45) Date of Patent: Jul. 15, 2008

(54) POCKET SAFETY HAND-MAKING ELECTRIC POWER AND RECHARGEABLE SYSTEM AND POCKET SIZE ELECTRIC APPLIANCE

(76) Inventor: Wing On Pang, Flat 5C, Block 1, Fu Ning Garden, Tseung Kwun O, N.T. (HK)

( * ) Notice: Subject to any disclaimer, the term of this patent is extended or adjusted under 35 U.S.C. 154(b) by 48 days.

(21) Appl. No.: 11/368,099

(22) Filed: Mar. 2, 2006

(65) Prior Publication Data

US 2006/0198130 A1    Sep. 7, 2006

(30) Foreign Application Priority Data

Mar. 3, 2005   (CN) .................... 2005 2 0055187 U
Feb. 28, 2006  (CN) .................... 2006 2 0004737 U (51) Int. Cl.
*H02K 7/18*    (2006.01)
(52) U.S. Cl. ....................................... 290/1 R
(58) Field of Classification Search .................. 290/31
See application file for complete search history.

(56) References Cited

U.S. PATENT DOCUMENTS

| | | | |
|---|---|---|---|
| 4,360,860 A * | 11/1982 | Johnson et al. | ............. 362/192 |
| 6,034,492 A * | 3/2000 | Saito et al. | ................... 318/141 |
| 6,380,711 B2 * | 4/2002 | Fischer et al. | ............... 320/106 |
| 6,858,951 B2 * | 2/2005 | Liao | ........................... 290/1 C |
| 6,914,340 B2 * | 7/2005 | Becker et al. | ............... 290/1 R |

2006/0155545 A1 *   7/2006   Jayne .......................... 704/272

FOREIGN PATENT DOCUMENTS

| | | | | |
|---|---|---|---|---|
| GB | 2332268 A | * | 6/1999 |
| JP | 58156235 A | * | 9/1983 |
| JP | 11288742 A | * | 10/1999 |
| JP | 2000287499 A | * | 10/2000 |
| JP | 2001136707 A | * | 5/2001 |
| JP | 2001189152 A | * | 7/2001 |
| WO | WO 0131764 A1 | * | 5/2001 |

* cited by examiner

*Primary Examiner*—Joseph Waks
(74) *Attorney, Agent, or Firm*—Raymond Y. Chan; David and Raymond Patent Firm (57) ABSTRACT

A Pocket S.H.E.R System unit and appliance with Pocket S.H.E.R System and an audio player which includes a manual power generation circuit, an output interface, and a safety control circuit. The input of the safety control circuit is electrically connected to the output of the manual power generation circuit, and its output is connected to the output interface. The system can provide a stable operating current for pocket-size electric appliances which greatly facilitate users. It features low production cost, simple process, and can serve as an independent power for various kinds of electric appliances. With the application of the Pocket S.H.E.R System to the existing players with audio play function, leads to the appliance with Pocket S.H.E.R System and an audio player. A user can manually charge rechargeable batteries or directly supply stable operating current for such players, which greatly facilitates the use of users, featuring convenient use and environment protection. The additional use of a USB interface and a flashlight facilitates users.

18 Claims, 5 Drawing Sheets

POCKET SAFETY HAND-MAKING ELECTRIC POWER AND RECHARGEABLE SYSTEM AND POCKET SIZE ELECTRIC APPLIANCE

BACKGROUND OF THE PRESENT INVENTION

1. Field of Invention

This invention relates to the field of power supplying units and audio players, especially a Pocket S.H.E.R System (Pocket Safety Hand-making Electric power and Rechargeable System) applicable to various types of pocket-size appliances or common appliances with the use of rechargeable batteries or external DC current.

2. Description of Related Arts

Presently, pocket-size electric appliances are in wide use, for example, pocket radios, radio receiving units, MP3 audio players, MP4 audio/video players, palm PCs, PSs, lighting devices, laptops, game players, cell phones, toys, LCD TVs, and so on. Most of these pocket-size electric appliances use rechargeable batteries for power supply, and meanwhile use DC power (or use a pocket transformer to convert the mains supply into DC power) for power supply. They are convenient to use. To increase the continuous power supply duration of batteries to bring more convenience to users, manufacturers make research on various rechargeable batteries with high power storage capacity and long service duration, from Ni—H batteries to the current lithium batteries. However, regardless of the stored power capacity of batteries, its continuous service duration is still limited. Thus, it is often the case that power failure of batteries always affects the use of batteries. In places where it is not very convenient to use electricity, for example, in trains, remote areas, mountain regions, and on the sea without mains supply, if batteries unfortunately cannot supply any power, and a user can find no appropriate place to buy ordinary batteries, the user will have no power to use. On one hand, this phenomenon may affect the interest of people, and on the other hand, it may bring great inconvenience to the work and life of the people, or even cause unexpected serious consequences. Furthermore, all the current players with the function of audio play use carbon batteries or alkaline batteries. It is well known that these batteries are relatively inexpensive, but will cause damage to the environment.

SUMMARY OF THE PRESENT INVENTION

Our Pocket S.H.E.R System is provided with the safety control electric circuit, hand-making electric power supply motor, and rechargeable battery. It can provide stable output power to supply all type the pocket electric item from the recharged battery or direct use the direct DC or hand-making electric power supply to support the operation. It can recharge the rechargeable battery either by the build-in hand-making electrical power supply motor or by direct DC input. This system may automatically cut off the main current keeping to charge the rechargeable battery from the direct DC input or by hand-making electric power supply motor. It can protect the rechargeable battery not over charged, and output power is keeping stable to support the power to operate all type of the pocket electric item. It can build-in inside the pocket radio, MP3, Palm, PS, lighting, laptop computer, games, cell phone, toy, LCD TV, lighting and all type of the pocket electric operation item, which form the aforesaid appliance with Pocket S.H.E.R System and an audio player. The manual control end of the Pocket S.H.E.R System could be located at any side of the appliance. It can make in individual power supply item to direct supply the power for all type of the electric operation item. The size can be adjusted, in order to increase or decrease the power supply for the different voltage operation item.

These and other objectives, features, and advantages of the present invention will become apparent from the following detailed description, the accompanying drawings, and the appended claims.

DETAILED DESCRIPTION OF THE PREFERRED EMBODIMENT

A further description of the invention will be given in the following sections according to the drawings and preferred embodiments.

Figure 1:
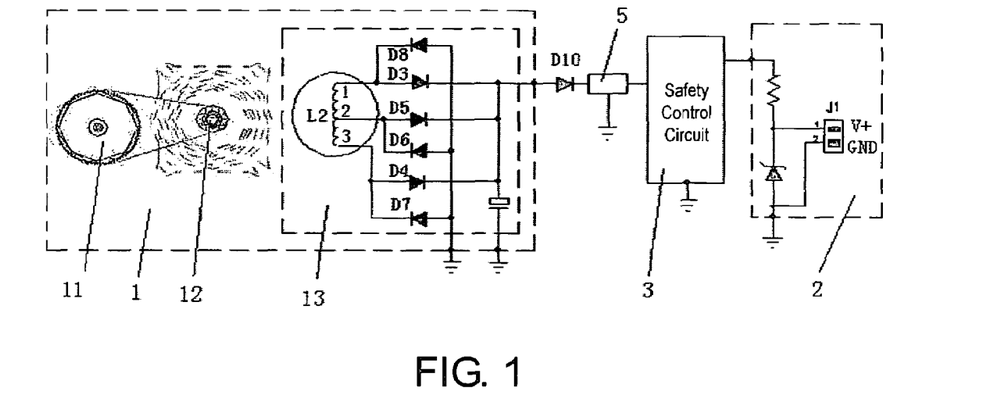
FIG. 1 is a circuit diagram of the power unit described in this invention.

As shown in FIG. 1, a Pocket S.H.E.R S system includes manual power generation circuit 1, output interface 2 and safety control circuit 3. The input of safety control circuit 3 is electrically connected to the output of manual power generation circuit 1, and its output is connected to output interface 2. Output interface 2 can be a standard interface directly connected to such a port-size electric appliance as mobile phone or MP3, or can merely be a wire.

If power is needed, directly drive the manual power generator with your hands, and the manual power generator will drive the internal wire coil to rotate around the permanent magnet to generate currents. The aforesaid currents, after rectification, passes safety control circuit 3, and can provide stable operating current for electric appliances.

Embodiment 1

Figure 2:
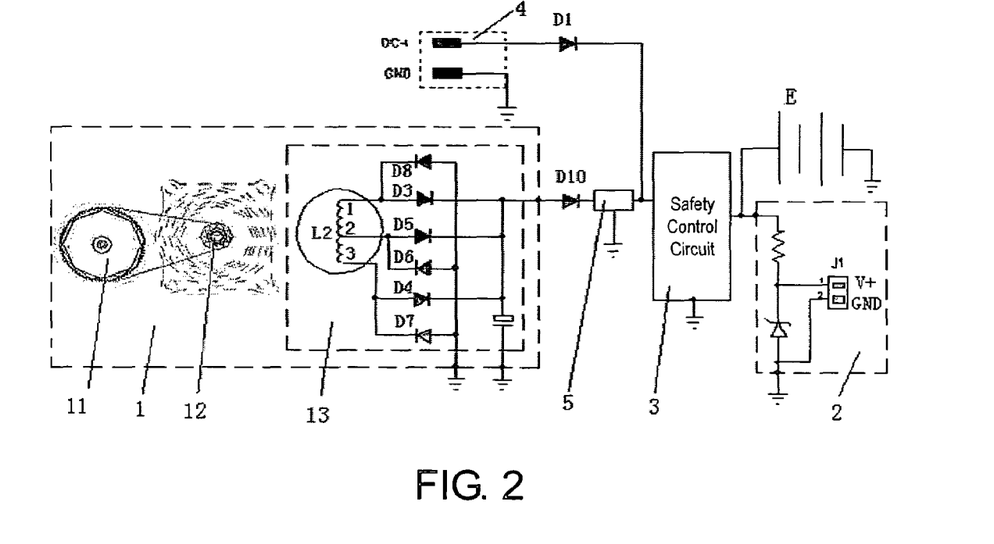
FIG. 2 is a circuit diagram of the first embodiment of this invention.

As shown in FIG. 2, a Pocket S.H.E.R System is mainly comprised of manual power generation circuit 1, output interface 2, safety control circuit 3, DC power interface 4, and rechargeable battery E.

The anode of the first diode D1 is connected to the output of the DC power interface 4, and its cathode is connected to the input of the safety control circuit 3. The anode of the tenth diode D10 is connected to the output of the manual power generation circuit 1, and its cathode is connected to one end of the voltage limiter 5. The other end of the voltage limiter 5 is connected to the input of the aforesaid safety control circuit 3. The output of the safety control circuit 3 is connected to the output interface 2 and the rechargeable battery E.

Wherein, the first diode D1 and the tenth diode D10 provide isolation function to prevent mutual backflow between manual power generation and external DC input. The circuit comprised of diode D3 through D8 is the rectifier circuit of the manual power generator. DC power interface 4 can be a standard socket or jack, or simply a wire, to facilitate the connection of the external DC power. Rechargeable battery E can be a rechargeable battery with fixed design, or a replaceable rechargeable battery.

Figure 3:
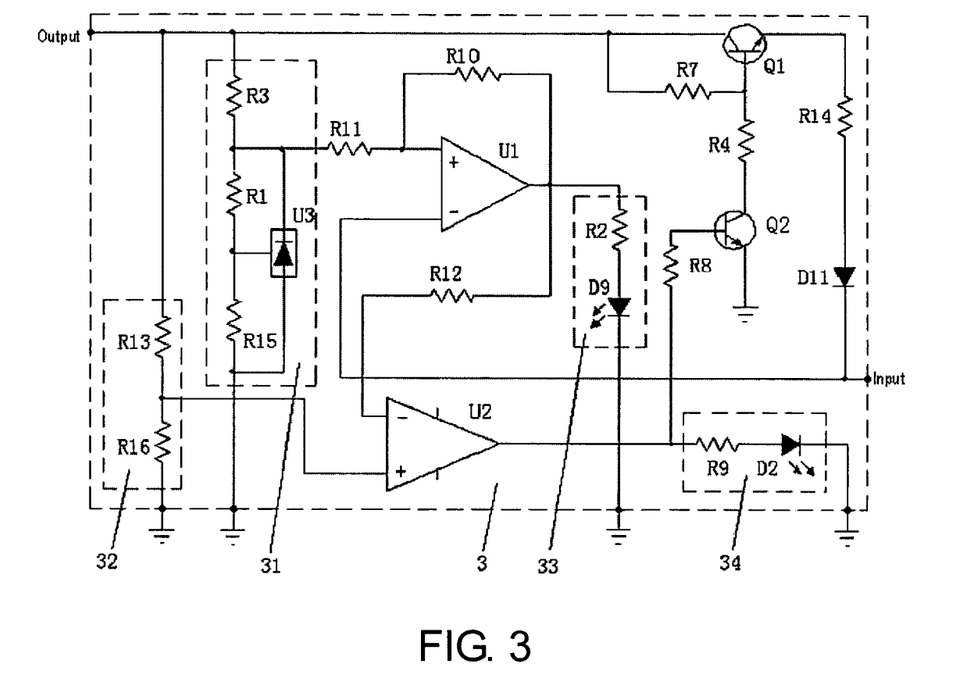
FIG. 3 is a circuit diagram of the safety control circuit of the power unit described in this invention.

As shown in FIG. 3, safety control circuit 3 is mainly composed of the first reference source circuit 31, the second reference source circuit 32, the first comparator U1, the second comparator U2, the first switch tube Q1, the second switch tube Q2, the "charging" indication circuit 33, and the "charged" indication circuit 34.

The inputs of the first reference source circuit 31 and the second reference source circuit 32 serve as the input of the safety control circuit 3, to be connected to the output of the manual power generation circuit 1. The positive input of the first comparator U1 is electrically connected to the output of the first reference source circuit 31, its inverting input is connected to the input of the output interface 2, and its output is electrically connected to the inverting input of the second comparator U2. The positive input of the second comparator U2 is connected to the output of the second reference source circuit 32, and its output is electrically connected to the base of the second switch tube Q2. The collector of the second switch tube Q2 is electrically connected to the base of the first switch tube Q1, and its emitter is grounded. The collector of the first switch tube Q1 is connected to the output of the aforesaid manual power generation circuit 1, and its emitter is electrically connected to the anode of the eleventh diode D11. The "charging" indication circuit 33 is a serially-connected branch composed of the ninth diode D9 and the second resistor R2. One end of the circuit is connected to the output of the aforesaid first comparator U1, and the other end is grounded. The "charged" indication circuit 34 is a serially-connected branch composed of the second diode D2 and the ninth resistor R9. One end of the circuit is connected to the output of the aforesaid second comparator U2, and the other end is grounded.

The first reference source circuit 31 is composed of the first resistor R1, the third resistor R3, the fifteenth resistor R15, and the voltage regulator U3. One end of the sequentially and serially-connected branch composed of the third resistor R3, the first resistor R1, and the fifteenth resistor R15 serves as the input of the first reference source circuit 31, and is connected to the output of the manual power generation circuit 1. The other end is grounded. The connecting point between the third resistor R3 and the first resistor R1 serves as the output of the first reference source circuit 31, and is connected to the positive input of the first comparator U1, and at the same time, connected to the cathode of the voltage regulator U3. The anode of the voltage regulator U3 is grounded, and its reference voltage end is connected to the connecting point between the first resistor R1 and the fifteenth resistor R15.

The second reference source circuit 32 is a serially-connected branch composed of the thirteenth resistor R13 and the sixteenth resistor R16. One end serves as of the input of the second reference source circuit 32 and is connected to the output of the manual power generation circuit 1, and the other end is grounded. The connecting point between the thirteenth resistor R13 and the sixteenth resistor R16 serves as the output of the second reference source circuit 32, and is connected to the positive input of the second comparator U2.

The fourth resistor R4 is connected between the base of the first switch tube Q1 and the collector of the second switch tube Q2. The seventh resistor R7 is connected between the collector and the base of the first switch tube Q1. The eighth resistor R8 is connected between the base of the second switch tube Q2 and the output of the second comparator U2. The tenth resistor R10 is connected between the positive input and the output of the first comparator U1. The eleventh resistor R11 is connected between the positive input of the first comparator U1 and the output of the first reference source circuit 31. The twelfth resistor R12 is connected between the output of the first comparator U1 and the inverting input of the second comparator U2. The fourteenth resistor R14 is connected between the emitter of the first switch tube Q1 and the anode of the eleventh diode D11. The cathode of the eleventh diode D11 is connected to the input of the output interface 2.

Wherein, the first reference source circuit 31 can provide the first comparator U1 with a reference voltage. The voltage regulator U3 is the voltage regulating IC TL431 that provides the first comparator U1 with a reference voltage. It can regulate the voltage to a desirable value by changing the resistance on the reference voltage end, featuring high voltage regulation precision. The second reference source circuit 32 can provide the second comparator U2 with a reference voltage. The first switch tube Q1 and the second switch tube Q2 are charging regulation and control tubes. In this embodiment, IGBT are selected as switch tubes. The fourth resistor R4 is the charging current limiting resistor. The eleventh diode D11 prevents the backflow of the rechargeable battery after the completion of charging.

Figure 4:
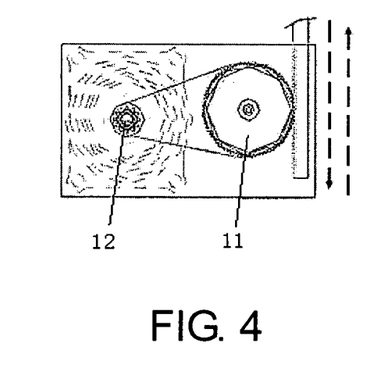
FIG. 4 is a structural relationship diagram of the drive wheel and motor in the first embodiment of the invention.

As shown in FIG. 4, the manual power generation circuit 1 is composed of drive wheel 11, motor 12, and rectifier circuit 13. The drive wheel 11 is connected to motor 12 through a drive unit. The output of the motor 12 is electrically connected to the rectifier circuit 13. When it is required to generate power manually, just roll the drive wheel 11 over the hand, desk, or the surface of other objects. The current generated can provide a stable voltage after passing the voltage limiter 5. Where, motor 12 can be an AC motor or a DC motor.

If without rechargeable battery E, this circuit can directly provide the electric appliances with stable working current.

When it is used as a rechargeable battery charger, the working principle of the circuit is as follows: The voltage from manual power generation circuit 1 or external DC power supply passes the seventh resistor R7, the first switch tube Q1, the fourteenth resistor R14, and the eleventh diode D11, and supplies charging power for rechargeable battery, and also provides a stable voltage for the first comparator U1. At the same time, the ninth diode D9 (LED) is on, indicating the charging is going on. At this time, the charging current is about 180 mA. When the rechargeable battery E is fully charged, the first comparator U1 overturns, the ninth LED D9 is off, the second LED D2 is on (indicating the rechargeable battery E is fully charged), and the second switch tube Q2 is conductive. At this time, through the current shunt of the fourth resistor R4, the charger turns to the trickle charge mode, and the output current is lower than 50 mA. The circuit is designed in compliance with the characteristics of Ni-MH batteries. The trickle charge is conducted lest that the rechargeable battery is not sufficiently charged. Trickle charge as long as 30 consecutive days will not have any impact on the battery.

Embodiment 2

In this embodiment, the circuit structure is the same as that in embodiment 1 except the manual power generation circuit 1.

Figure 5:
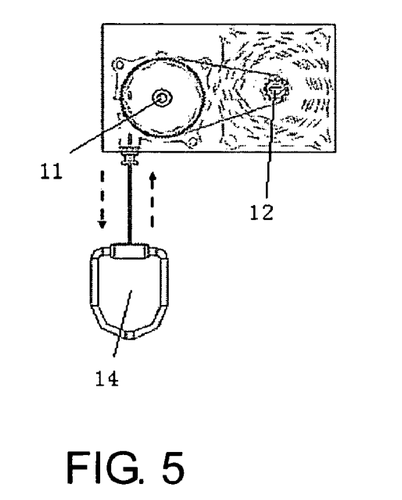
FIG. 5 is the structural diagram of the drive wheel, motor and drive unit in the second embodiment of the invention.

As shown in FIG. 5, the manual power generation circuit 1 is composed of drive wheel 11, motor 12, rectifier circuit 13 and drive unit. The aforesaid drive wheel 11 is connected to motor 12 through the drive unit. The output of the motor 12 is electrically connected to the rectifier circuit 13. The drive unit is composed of a flexible cord wound around the drive wheel 11 and a manual ring. When it is required to generate power manually, pull the aforesaid manual ring repeatedly.

Embodiment 3

In this embodiment, the circuit structure is the same as that in embodiment 1 except the manual power generation circuit 1.

Figure 6:
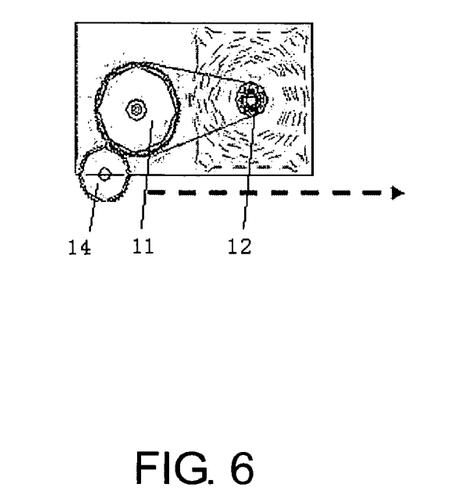
FIG. 6 is the structural diagram of the drive wheel, motor and drive unit in the third embodiment of the invention.

As shown in FIG. 6, the manual power generation circuit 1 is composed of drive wheel 11, motor 12, rectifier circuit 13 and drive unit. The aforesaid drive wheel 11 is connected to motor 12 through the drive unit. The output of the motor 12 is electrically connected to the rectifier circuit 13. The drive unit is a gear engaged with the drive wheel 11, that is, the aforesaid gear serves as manual control end 14. When it is required to generate power manually, just roll the gear wheel over the hand, desk, or the surface of other objects repeatedly.

Embodiment 4

In this embodiment, the circuit structure is the same as that in embodiment 1 except the manual power generation circuit 1.

Figure 7:
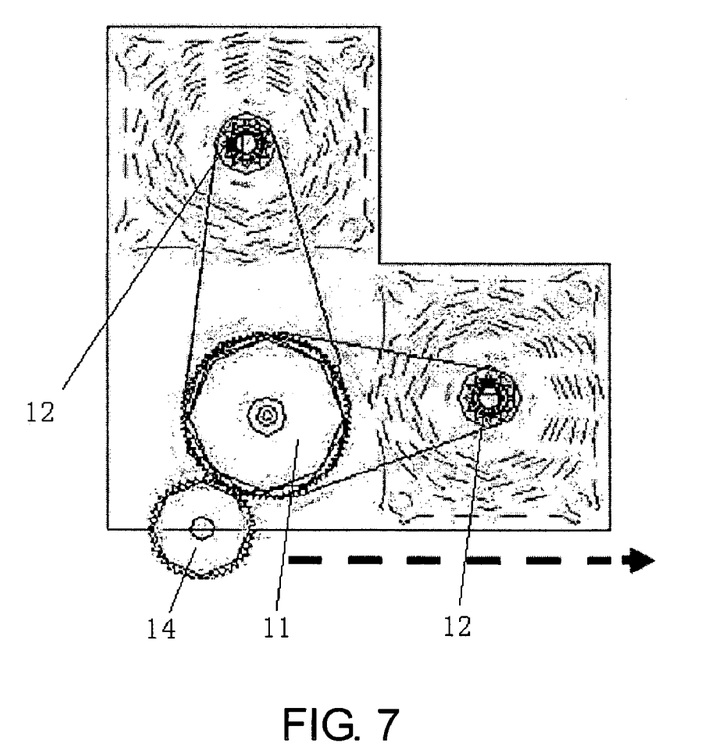
FIG. 7 is a circuit diagram of the fourth embodiment of this invention.

As shown in FIG. 7, the manual power generation circuit 1 is composed of drive wheel 11, two motors 12, rectifier circuit 13 and drive unit. The aforesaid drive wheel 11 is connected to two motors 12 through the drive unit respectively. The outputs of the motors 12 are electrically connected to the rectifier circuit 13. The drive unit is a gear engaged with the drive wheel 11, that is, the aforesaid gear serves as manual control end 14. When it is required to generate power manually, just roll the gear wheel over the hand, desk, or the surface of other objects repeatedly.

With a battery or external DC power, this device can provide stable current for a large variety of pocket-size electric appliances. It can be used to charge a battery through external DC power or the manual power generator. To prevent overcharge, when the battery is fully charged, the system can automatically cut off the power supply circuit. This device can be installed in and fixed to pocket radios (radio receiving units, MP3 players, palm PCs, PSs, lighting devices, laptops, game players, cell phones, toys, LCD TVs, and other types of mini electric appliances. The device can supply power for various electric appliances as an independent power source.

To supply power for high-voltage equipment, adjust the size of this device to meet the requirement. Enlarge manual power generation circuit 1 and adjust then parameters of components in the circuit. Therefore, this invention is also applicable to high-voltage equipment.

Embodiment 5

The appliance with Pocket S.H.E.R System and an audio player described in this invention refers to such portable players such as MP3 audio players, MP4 video players, portable game players, mobile phones and palm PCs. Similar to existing players with the function of audio play, the player of this invention includes the central control circuit, data memory, decoder, digital/analog converter, buttons and data interface configured in the case of the appliance. But especially, the appliance of this invention also includes manual power generation circuit 1 and safety control circuit 3. The aforesaid manual power generation circuit 1 can convert mechanical energy into electric energy that is output through safety control circuit 3 to supply power for the aforesaid appliance with the function of audio play. Safety control circuit 3 is used to rectify and regulate the output of manual power generation circuit 1 so that the output voltage is more stable.

Figure 9:
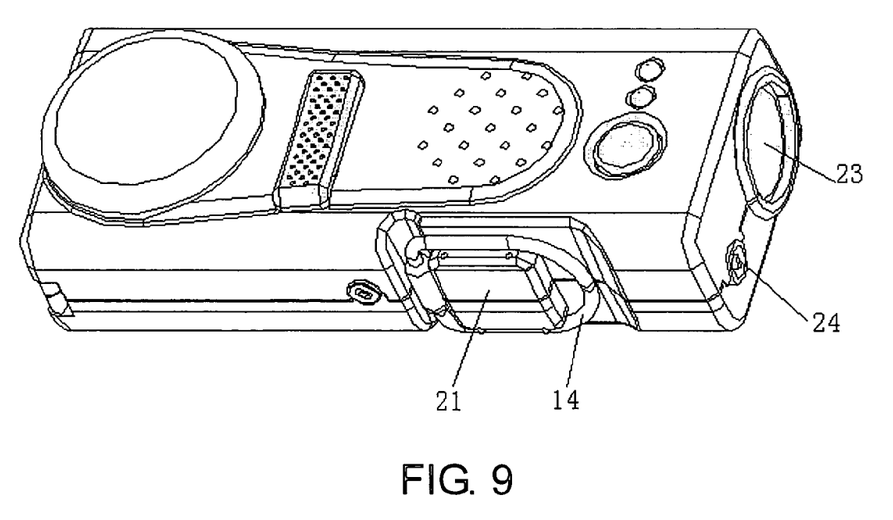
FIG. 9 is a solid diagram of the player with the function of audio play described in this invention.
Figure 10:
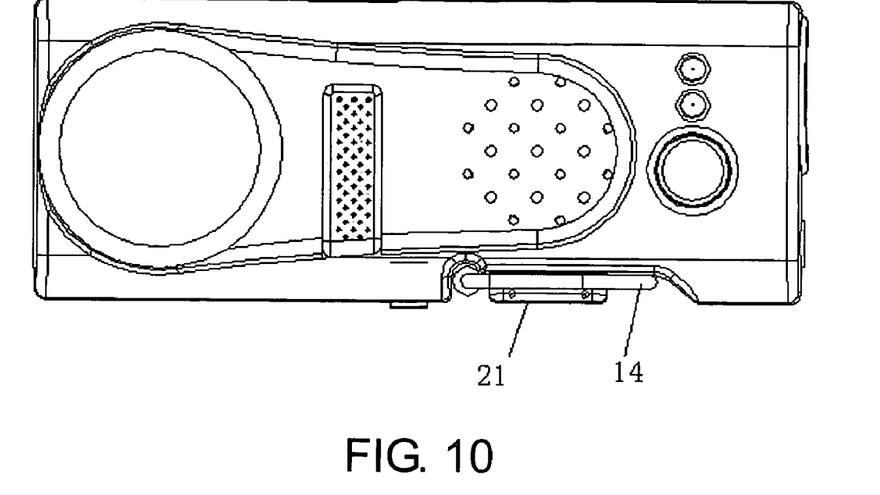
FIG. 10 is a main view of the player with the function of audio play described in this invention.
Figure 11:
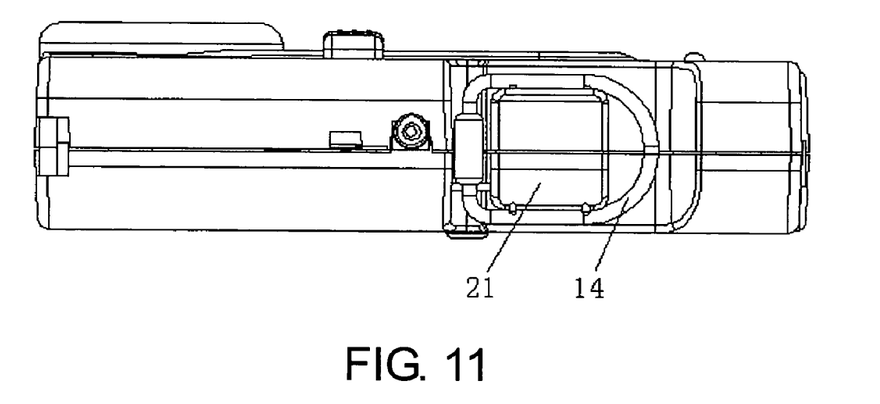
FIG. 11 is a bottom view of the player with the function of audio play described in this invention.

As shown in FIG. 1 and FIG. 5, manual power generation circuit 1 includes drive wheel 11, motor 12, rectifier circuit 13 and a drive unit. The aforesaid drive wheel 11 is connected to motor 12 through the drive unit, and the output of motor 12 is electrically connected to rectifier circuit 13. Rectifier circuit 13 is composed of branch from diodes D3 to D8. The drive unit is composed of a flexible cord wound around drive wheel 11 and manual control end 12 connected to it. The aforesaid manual control end 14 is a manual ring that protrudes out of the case of the appliance with Pocket S.H.E.R System and an audio player through an opening and can be fixed onto projection 21 on the case, as shown in FIGS. 9 through 11. To implement manual power generation, take the manual ring from projection 21, and pull the ring repeatedly. After passing voltage limiter 5, the generated current can supply stable voltage. Wherein, motor 12 can either be an AC motor or a DC motor. The tenth diode D10 has the isolation function.

Figure 8:
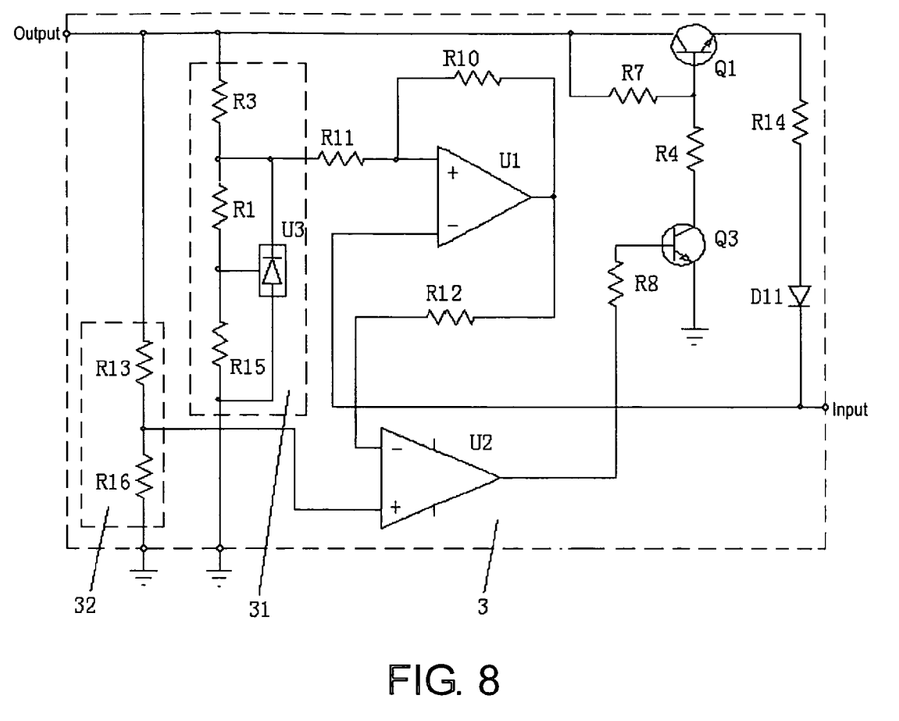
FIG. 8 is the circuit diagram of the safety control circuit in the fifth embodiment of the invention.

As shown in FIG. 8, safety control circuit 3 in embodiment 1 (as shown in FIG. 3) and safety control circuit in this embodiment have basically the same operating principles, and the only difference is that safety control circuit 3 in this embodiment does not have "charging" indication circuit 33 and "charged" indication circuit 34.

Figure 12:
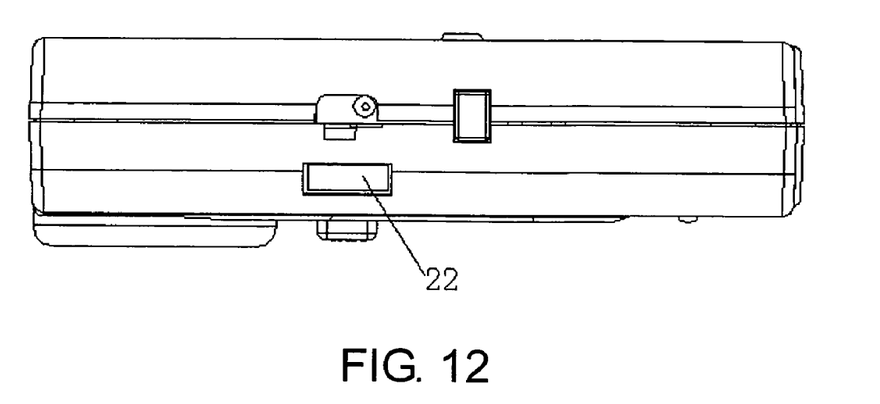
FIG. 12 is a top view of the player with the function of audio play described in this invention.

In this invention, manual power generation circuit 1 is directly connected to the central control circuit of the appliance with the Pocket S.H.E.R System and an audio player through safety control circuit 3, to convert mechanical energy into electric energy to supply power for the afroresaid appliance. In the meantime, the output of safety control circuit 3 is electrically connected to the rechargeable battery box of the appliance with Pocket S.H.E.R System and an audio player, to charge the rechargeable batteries in case of insufficient power capacity, As shown in FIG. 12.

An improvement of this invention lies in that: the appliance with Pocket S.H.E.R System and an audio player will serve as USB interface 22 (that is, a data transmission interface) and meanwhile serve as a DC power interface, and is connected to the input of safety control circuit 3 through the first diode D1. Where, the first diode D1 has the function of isolation, to prevent mutual backflow of the manually generated electric power and the external DC input. Thus, in case of convenient mains supply, external DC power can be used to supply power for the appliance with Pocket S.H.E.R System and an audio player, or to charge rechargeable batteries of the aforesaid appliance.

An improvement of this invention lies in that: the appliance is embedded with a radio controlled by the central control circuit. The radio antenna is the aforesaid USB interface 22. In idle cases, USB interface 22 serves as the antenna of the radio; in case a DC power is connected, it serves as a power interface; in case of connection with a PC or other player with the function of audio play, it serves as a data transmission interface, featuring great convenience.

Another improvement of this invention lies in that: the appliance is embedded with flashlight 23, its control button 24 is exposed out of the case of the appliance through an opening on the appliance case, its light source output provides light energy for externally through another opening on the aforesaid case, its power input is connected to the battery box and the output of safety control circuit 3, as shown in FIG. 9.

Embodiment 6

Compared with Embodiment 5, the only difference between this embodiment and Embodiment 5 lies in that: the drive unit here is a gear engaged with the aforesaid drive wheel, that is, a gear of the aforesaid manual control end 14, as shown in FIG. 6. When it is required to generate power manually, just roll the gear wheel over the hand, desk, or the surface of other objects repeatedly.

The beneficial result of the described example of the invention lies variously in that: (a) In a place with inconvenient mains supply or DC supply, the Pocket S.H.E.R Systemsystem described can be used to manually supply power for rechargeable batteries or directly supply stable operating current for pocket-size electric appliances, which greatly facilitates the use of users. (b) The system described can serve as a common charger for rechargeable batteries, which brings great convenience to the use of various pocket-size appliances powered by batteries. (c) When the system described serves as a common charger for rechargeable batteries, after the rechargeable batteries are fully charged, the system can automatically cut off the power supply circuit, which ensures high safety. (d) The system described features low production cost and simple process. (e) The system described can serve as an independent power supply unit to supply power for various electric appliances. To supply power for high-voltage equipment, adjust the size of the unit to meet the requirement. (f). Furthermore, with the application of the system to the existing players with audio play function, a user can manually charge rechargeable batteries or directly supply stable operating current for such players, which greatly facilitates the use of users, featuring convenient use and environment protection. (g) With the additional USB interface, the unit provides the function of DC power interface, data transmission interface and radio antenna for players with the function of audio play, featuring great convenience. (h) With the application of a flashlight, a user can use the flashlight on the appliance for lighting purpose in special cases. Since manual power generation is used to supply power for the appliance, the use of the flashlight is not limited by the power.

Thus, the reader will see that the described examples of the invention provide a convenient, low-cost, and easily upgradeable element that not only provides manually charging safety power to meet the people's requirement for common or emergency recharging and power supply, but also to serve as a charger of rechargeable batteries. It also provides an appliance to overcome defects of the existing technologies.

Although the description above contains many specificities, these should not be construed as limiting the scope of the invention, but as merely providing illustrations of some of the presently preferred embodiments of this invention. Many other variations are possible. Thus, the scope of the invention should be determined by the appended claims and their legal equivalents, rather than by the embodiments illustrated herein.

What is claimed is:

1. A pocket safety hand-making electric power and rechargeable system for an electrical device, comprising:

a manual power generation circuit which comprises a drive wheel which is adapted to be mechanically actuated for converting mechanical energy into a corresponding amount of electrical energy;

an output interface electrically connected with said manual power generation circuit, wherein said electrical energy converted by said manual power generation circuit is transferred to said outer interface for operating said electrical device; and     a safety control circuit which is electrically connected to said manual power generation circuit and said output interface, and comprises a first and a second reference source circuit, a first and a second comparator, a first and a second switch tube, and an indication circuit electrically connected to said first and said second comparator, wherein said first comparator is electrically connected to said first reference source circuit, said manual power generation circuit, said output interface and said second comparator, which is electrically connected to said second reference source circuit and said second switch tube, which is electrically connected with said first switch tube, such that said safety control circuit is adapted to control said electrical energy supplied to said outer interface when said manual power generation circuit is mechanically actuated.

2. The system, as recited in claim 1, further comprising a DC power interface and a first diode having an anode and a cathode, wherein said anode of said first diode is electrically connected to an output terminal of said DC power interface, and said cathode of said first diode is connected to an input terminal of said safety control circuit.

3. The system, as recited in claim 2, further comprising a tenth diode and a voltage limiter, wherein an anode of said tenth diode is electrically connected to an output terminal of said manual power generation circuit, and a cathode of said tenth diode is electrically connected to said voltage limiter, wherein said voltage limiter is electrically connected to an input terminal of said safety control circuit.

4. The system, as recited in claim 3, wherein said indication circuit further comprises a charging indication circuit and a charged indication circuit, wherein said charging indication circuit is a serially-connected branch composed of a ninth LED and a second resistor electrically connected to an output terminal of said first comparator, wherein said charged indication circuit is a serially-connected branch composed of a second LED and a ninth resistor electrically connected to an output terminal of said second comparator.

5. The system, as recited in claim 4, wherein said manual power generation circuit comprises a drive wheel, a motor, a driving unit and a rectifier circuit, wherein said drive wheel is connected with said motor through said driving unit, wherein said motor is electrically connected to said rectifier circuit, in such a manner that when said drive wheel is adapted to mechanically actuate said motor for generating said electrical energy at said rectifier circuit and transferred to said outer interface.

6. The system, as recited in claim 5, wherein said manual power generation circuit further comprises a flexible cord wound around said drive wheel, and a manual ring connected to said drive wheel for a user to mechanically actuate said manual power generation circuit.

7. The system, as recited in claim 5, wherein said manual power generation circuit further comprises a drive unit extended from said drive wheel, wherein a user is able to actuate said drive unit in order to actuate said power generation circuit for generating electrical energy to said output interface.

8. The system, as recited in claim 7, further comprising a rechargeable battery electrically connected with said manual power generation circuit for storing said electrical power generated by said manual power generation circuit before being consumed though said output interface.

9. The system, as recited in claim 8, further comprising a USB interface electrically connected to said safety control circuit in such a manner that said output input is adapted to selectively acquire electrical power through said USB interface.

10. The system, as recited in claim 5, further comprising a rechargeable battery electrically connected with said manual power generation circuit for storing said electrical power generated by said manual power generation circuit before being consumed though said output interface.

11. The system, as recited in claim 10, further comprising a USB interface electrically connected to said safety control circuit in such a manner that said output input is adapted to selectively acquire electrical power through said USB interface.

12. The system, as recited in claim 1, wherein said manual power generation circuit comprises a drive wheel, a motor, a driving unit and a rectifier circuit, wherein said drive wheel is connected with said motor through said driving unit, wherein said motor is electrically connected to said rectifier circuit, in such a manner that when said drive wheel is adapted to mechanically actuate said motor for generating said electrical energy at said rectifier circuit and transferred to said outer interface.

13. The system, as recited in claim 12, wherein said manual power generation circuit further comprises a flexible cord wound around said drive wheel, and a manual ring connected to said drive wheel for a user to mechanically actuate said manual power generation circuit.

14. The system, as recited in claim 12, wherein said manual power generation circuit further comprises a drive unit extended from said drive wheel, wherein a user is able to actuate said drive unit in order to actuate said power generation circuit for generating electrical energy to said output interface.

15. An electrical appliance, comprising:
a portable electrical device adapted for performing a predetermined electrical function; and
a pocket safety hand-making electric power and rechargeable system electrically connected with said portable electrical device, and comprises:
a manual power generation circuit which comprises a drive wheel which is adapted to be mechanically actuated for converting mechanical energy into a corresponding amount of electrical energy;
an output interface electrically connected with said manual power generation circuit, wherein said electrical energy converted by said manual power generation circuit is transferred to said outer interface for operating said electrical device; and
a safety control circuit which is electrically connected to said manual power generation circuit and said output interface, and comprises a first and a second reference source circuit, a first and a second comparator, a first and a second switch tube, and an indication circuit electrically connected to said first and said second comparator, wherein said first comparator is electrically connected to said first reference source circuit, said manual power generation circuit, said output interface and said second comparator, which is electrically connected to said second reference source circuit and said second switch tube, which is electrically connected with said first switch tube, such that said safety control circuit is adapted to control said electrical energy supplied to said outer interface when said manual power generation circuit is mechanically actuated, such that said pocket safety hand-making electric power and rechargeable system is capable of continuously supplying electrical energy to said electrical device by manually actuating said manual power generation circuit.

16. The electrical appliance, as recited in claim 15, wherein said portable electrical device comprises a flashlight comprising a light source which is arranged to provide illumination, wherein said portable electrical device is electrically connected to said safety control circuit for acquiring manually generated electrical energy from said manual power generation circuit.

17. The electrical appliance, as recited in claim 15, wherein said portable electrical device comprises a radio which is arranged to deliver audible sound through radio signal, wherein said portable electrical device is electrically connected to said safety control circuit for acquiring manually generated electrical energy from said manual power generation circuit.

18. The electrical appliance, as recited in claim 15, wherein said portable electrical device comprises a multimedia player which is arranged to deliver multimedia signal, wherein said portable electrical device is electrically connected to said safety control circuit for acquiring manually generated electrical energy from said manual power generation circuit.

* * * * *